(No Model.)
J. R. CRIBBS.
NUT LOCK.
No. 522,971. Patented July 17, 1894.
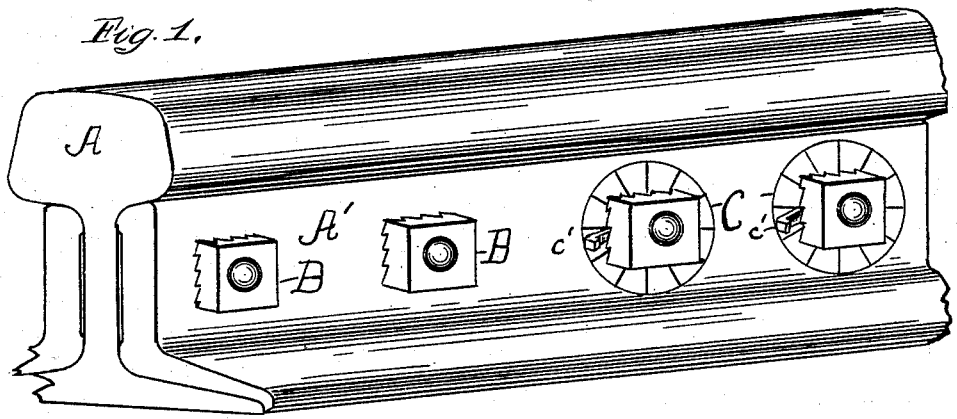
Fig. 1.
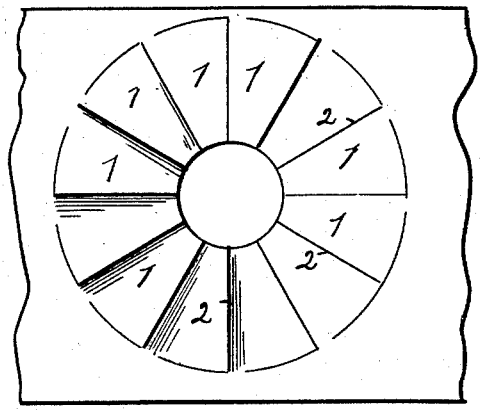
Fig. 2.
Fig. 4.
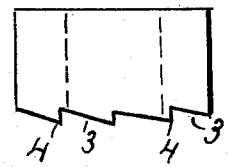
Fig. 5.
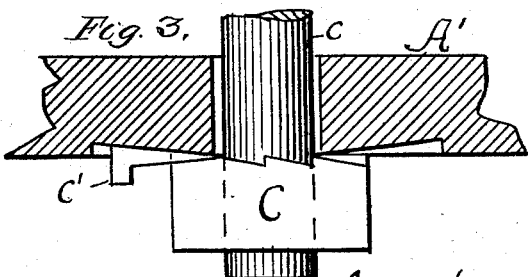
Fig. 3.
Witnesses:
G. H. Harvey
J. D. May
Inventor:
John R. Cribbs
by J. H. Stevenson
Atty

UNITED STATES PATENT OFFICE.

JOHN R. CRIBBS, OF VERONA, PENNSYLVANIA.

NUT-LOCK.

SPECIFICATION forming part of Letters Patent No. 522,971, dated July 17, 1894.

Application filed February 16, 1894. Serial No. 500,440. (No model.)

*To all whom it may concern:*

Be it known that I, JOHN R. CRIBBS, a citizen of the United States, residing at Verona, in the county of Allegheny and State of Pennsylvania, have invented certain new and useful Improvements in Nut-Locks; and I do hereby declare the following to be a full, clear, and exact description of the invention, such as will enable others skilled in the art to which it pertains to make and use the same, reference being had to the accompanying drawings, which form a part of this specification.

This invention relates to certain improvements in nut locks and has for its object to provide a device of this character of a novel and improved construction which shall present certain advantages over other similar forms heretofore devised all as will be hereinafter fully set forth.

The novel features of the invention will be carefully defined in the claim.

In order that the invention may be the better understood I have shown in the accompanying drawings a nut lock embodying the invention, in which drawings—

Figure 1 is a perspective view of a rail joint provided with my improved nut lock and Fig. 2 is a face view of the fish-plate employed therein. Fig. 3 is a cross section taken through the fish-plate and showing the bolt, nut and locking devices. Figs. 4 and 5 are views of the nut employed in my locking device.

In the views A represents the rail and A′, A′ the fish-plates.

C, C, represent the nuts, each of which is provided on its inner face with a series of radial serrations 4, 4, having between them inclined recesses 3, 3, as clearly seen in Figs. 4 and 5.

Formed upon the fish plate, concentric with the bolt hole therein is a corresponding series of radiating ribs or serrations 2, 2, adapted to engage and enter the recesses 3, 3 in the nut and between these serrations 2 are formed the inclined recesses or cavities 1, 1, adapted to receive the serrations 4 on the nut. These recesses or cavities 1 are, as shown in Fig. 3, provided with squared end walls at their outer ends and are deepest at said ends being gradually inclined toward the surface at their converging ends.

C′ is a locking pin having an inclined or wedge shaped end and a squared head projecting from one side of its larger end. When the nut has been screwed up as closely as may be possible against the fish-plate, this pin C′ is inserted with its tip in one of the recesses 1 in the fish-plate and is then driven in until its squared outer end or head sinks into the said recess 1 and is thereby held against slipping out of place. Thus the wedge shaped portion of the locking pin comes to bear between one of the serrations 4 on the nut and one of the serrations 2 on the fish-plate and holds the nut firmly against back rotation.

By preference, the bolt hole in the fish-plate will be made, as shown in Fig. 3, of a slightly larger diameter than the bolt c, but the engagement of the outer end of pin C′ with the end wall of recess 1 will usually be sufficient to accomplish this result, unless the nut be screwed up very loosely against the fish-plate so that a comparatively wide space separates the nut from the fish-plate.

Having thus described my invention, I claim—

In a nut-lock, the combination of the fish-plate and a nut, having each a bolt hole and each provided on their adjacent sides with a series of alternating serrations and recesses radiating from said bolt hole, the recesses in the fish-plate extending beyond the sides of the nut and having their outer end walls arranged at right angles to their bottoms, the bolt passing through the fish-plate and the nut, and a wedge-shaped locking pin arranged between said nut and fish-plate and provided with a square head adapted to engage the outer end wall of the recess in the fish-plate, substantially as set forth.

In testimony that I claim the foregoing I hereunto affix my signature, in the presence of two witnesses, this 24th day of January, A. D. 1894.

JOHN R. CRIBBS. [L. S.]

In presence of—
J. K. BARBOUR,
H. C. MOORE.